(12) United States Patent
Mizutani et al.

(10) Patent No.: US 6,595,576 B2
(45) Date of Patent: Jul. 22, 2003

(54) HOUSING FOR MEMBER DISPOSED AT VEHICLE EXTERIOR

(75) Inventors: Toshinobu Mizutani, Aichi-ken (JP); Kiyohide Imaeda, Aichi-ken (JP); Yoshio Ohashi, Aichi-ken (JP); Masakazu Aoki, Aichi-ken (JP); Masaaki Ito, Aichi-ken (JP); Wataru Horio, Aichi-ken (JP); Masahide Inayama, Aichi-ken (JP); Tadayoshi Kato, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/824,243

(22) Filed: Apr. 3, 2001

(65) Prior Publication Data
US 2001/0028178 A1 Oct. 11, 2001

(30) Foreign Application Priority Data
Apr. 10, 2000 (JP) .......................................... 2000-108510

(51) Int. Cl.$^7$ ................................ B60J 1/20; B60R 1/06
(52) U.S. Cl. ..................... 296/152; 296/180.1; 296/185
(58) Field of Search ................................ 296/152, 37.1, 296/37.7, 37.13, 146.1, 180.1, 185; 248/479

(56) References Cited
U.S. PATENT DOCUMENTS

| | | | | |
|---|---|---|---|---|
| 4,334,211 A | * | 6/1982 | McConnell et al. .......... 296/1.1 |
| 4,538,851 A | * | 9/1985 | Taylor .......................... 296/1.1 |
| 5,059,015 A | * | 10/1991 | Tran ............................ 359/844 |
| 5,150,941 A | * | 9/1992 | Silzer et al. ................ 296/152 |
| 5,240,536 A | * | 8/1993 | Kurobe .................... 296/180.1 |
| 5,245,480 A | * | 9/1993 | Polzer ........................ 359/841 |
| 5,268,795 A | * | 12/1993 | Usami ........................ 359/841 |
| 5,621,577 A | * | 4/1997 | Lang et al. ................. 248/479 |
| 5,771,526 A | * | 6/1998 | Burton ...................... 296/37.1 |
| 5,851,000 A | * | 12/1998 | Mittelhauser et al. ....... 248/479 |
| 6,012,819 A | * | 1/2000 | Pai .............................. 248/479 |
| 6,024,459 A | * | 2/2000 | Lewis ........................ 248/479 |
| 6,158,639 A | * | 12/2000 | De Silva et al. ............ 224/321 |
| 6,213,537 B1 | * | 4/2001 | Butz et al. .................. 296/152 |
| 6,276,747 B1 | * | 8/2001 | Ogawa et al. ........... 296/180.1 |
| 6,419,300 B1 | * | 7/2002 | Pavao et al. ............. 296/180.1 |

* cited by examiner

Primary Examiner—D. Glenn Dayoan
Assistant Examiner—G Blankenship
(74) Attorney, Agent, or Firm—Nixon Peabody LLP; Thomas W. Cole

(57) ABSTRACT

A housing for a member disposed at a vehicle exterior is formed by assembling a plurality of parts substantially in a vehicle longitudinal direction. At a matching portion when the plurality of parts are assembled together substantially in the vehicle longitudinal direction, a housing outer side end portion of a matching surface substantially at a vehicle frontward side is displaced further outward than a housing outer side end portion of a matching surface substantially at a vehicle rearward side. Or, the housing outer side end portion of the matching surface substantially at the vehicle rearward side may have a curved surface or a flat surface.

18 Claims, 7 Drawing Sheets

HOUSING FOR MEMBER DISPOSED AT VEHICLE EXTERIOR

BACKGROUND OF THE INVENTION

1. Field of the Invention

The present invention relates to a housing used for accommodating a member disposed at a vehicle exterior such as a door mirror provided at a vehicle exterior or the like.

2. Description of the Related Art

Recently, the performances of engines, tires and the like of vehicles have been improved, and improvements have also been made with respect to reduction of noise while the vehicle is traveling. However, as noise reduction has been improved, unpleasant noises which have not been heard before are heard in the vehicle interior. Therefore, there has been desired a reduction in such unpleasant noise or prevention of generation of unpleasant noise.

One kind of such unpleasant noises is a noise which relates to an air flowing on surfaces of respective parts of the vehicle or of parts mounted to the vehicle exterior while the vehicle is traveling. Examples of parts mounted to the vehicle exterior include a door mirror.

A door mirror which is provided at the side of a door of a vehicle to view, from the vehicle interior, the region substantially at the rear of the vehicle includes a visor which opens substantially toward the vehicle rearward side when mounted on the vehicle. A main body of the mirror is accommodated within the visor.

There are structures in which an annular visor rim, which corresponds to an open end shape of a visor cover, is mounted to the open end of the visor cover which opens substantially toward the vehicle rearward side when the visor cover is mounted on the vehicle. When the visor cover and the visor rim are joined, a matching surface at the visor cover side and a matching surface at the visor rim side face substantially along the vehicle longitudinal direction. Therefore, the gap formed between these matching surface opens in a direction perpendicular to the direction in which the airflow advances. In this case, the flowing air may collide with the matching surface positioned at the downstream side in the direction in which the airflow advances. Or, the direction in which the airflow advances may be changed rapidly by the matching surfaces. As a result, the unpleasant noise known as cutting the wind is generated.

In particular, as the door mirror is mounted at the side of the door, which is relatively near a driver's seat or a front passenger's seat, the unpleasant noise can be easily heard by passengers. Accordingly, there has been desired a reduction in the unpleasant noise caused by air flowing on the surface of the visor of the door mirror, or prevention of generation thereof.

SUMMARY OF THE INVENTION

In view of the aforementioned facts, an object of the present invention is to provide a housing of parts of a device disposed at the vehicle exterior, such as a visor of a door mirror or the like, which can reduce or prevent the unpleasant noise caused by air flowing on the surface (the outer surface) of the housing.

In accordance with a first aspect of the present invention, a housing for a member disposed at a vehicle exterior which is formed by assembling a plurality of parts substantially in a vehicle longitudinal direction, the housing includes a matching portion which is exposed at an outer surface of the housing at a boundary of the plurality of parts when the plurality of parts are assembled together; and matching surfaces of the plurality of parts which oppose each other at the matching portion substantially in the vehicle longitudinal direction, wherein a housing outer side end portion of the matching surface positioned substantially at a vehicle frontward side is displaced further toward an outer side than a housing outer side end portion of the matching surface positioned substantially at a vehicle rearward side.

While the vehicle is traveling, air flows on the outer surface of the housing substantially from the vehicle frontward side to the vehicle rearward side. At this time, the airflow flows on the outer surface of the part positioned relatively at the upstream side in the direction in which the airflow advances, that is, on the outer surface of the part positioned substantially at the vehicle frontward side (which part is referred to as the "front part" hereinafter). Then, the airflow flows on the outer surface of the part positioned at the downstream side in the direction in which the airflow advances, that is, on the outer surface of the part positioned substantially at the vehicle rearward side (which part is referred to as the "rear part" hereinafter).

In the housing of the present invention, at the matching portion which is a boundary between the parts when the parts are assembled together and which is exposed at the outer surface of the housing, the housing outer side end portion of the matching surface of the front part is displaced further outward than the housing outer side end portion of the matching surface of the rear part.

The matching surface of the rear part substantially faces the vehicle frontward side which opposes the above-described airflow. When the housing of the present invention is seen substantially from the vehicle frontward side, the matching surface of the rear part is hidden by the front part and cannot be seen. Accordingly, when the aforementioned airflow passes on the matching portion, the airflow does not collide with the matching surface of the rear part and the direction thereof is not rapidly changed. As a result, the airflow smoothly flows on the outer surface of the housing. Thus, generation of an unpleasant noise such as a so-called "noise for cutting the wind" or the like due to the airflow passing on the outer surface of the housing can be reduced or prevented.

In accordance with the housing for a member disposed at a vehicle exterior relating to the present invention, among the matching surfaces opposing each other substantially along the vehicle longitudinal direction, an amount of displacement of a housing outer side end portion of the matching surface positioned substantially at the vehicle frontward side with respect to the housing outer side end portion of the matching surface positioned substantially at the vehicle rearward side is 0.5 mm or less. Further, a distance between the matching surfaces opposing each other substantially in the vehicle longitudinal direction is 1.0 mm or less.

In accordance with the housing for a member disposed at the vehicle exterior having the above-described structure, the housing outer side end portion of the matching surface substantially at the vehicle frontward side (that is, the matching surface of the front part) is displaced further outward than the housing outer side end portion of the matching surface substantially at the vehicle rearward side (that is, the matching surface of the rear part). The amount of displacement thereof (the difference in levels or the dimensional difference therebetween) is 0.5 mm or less. The distance between the matching surface substantially at the vehicle frontward side and the matching surface substantially at the vehicle rearward side opposing each other is 1.0 mm or less. Thus when the airflow passes on the matching portion, the airflow does not collide with the matching surface of the rear part and the direction of the airflow is not changed rapidly. As a result, the airflow smoothly flows on the outer surface of the housing. An unpleasant noise such as the noise of cutting the wind or the like when the airflow passes on the outer surface of the housing can be effectively reduced or prevented.

The housing for a member disposed at a vehicle exterior according to the present invention is preferably formed of a synthetic resin material which becomes hard after hardening thereof. Further, one of the plurality of parts assembled together substantially in the vehicle longitudinal direction has a fitting portion having a substantially U-shaped connecting portion. Moreover, the plurality of parts, in an assembled together state, is mounted at a side of a door of a vehicle, and a mirror is accommodated within an assembly of the plurality of parts assembled together. A support, which supports the mirror such that the mirror can pivot about axes which are substantially along a vehicle vertical direction and the vehicle longitudinal direction, is accommodated within the assembly.

The housing of the present invention is applied to a housing of a device which is mounted at the side of a door at the vehicle exterior or on a body panel and in which, other than the reflecting device such as a mirror or the like, a lighting device such as a light bulb, an alarm device such as an alarm whistle, or the like may be accommodated. Thus, an unpleasant noise (for example, the noise of cutting the wind) can be reduced or prevented.

In accordance with a second aspect of the present invention, there is provided a housing for a member disposed at a vehicle exterior which is formed by assembling a plurality of parts together substantially in a vehicle longitudinal direction, the housing includes a matching portion which is exposed at an outer surface of the housing at a boundary between the plurality of parts when the plurality of parts are assembled together; and matching surfaces of the plurality of parts opposing each other at the matching portion substantially in the vehicle longitudinal direction, wherein a corner portion of the matching surface substantially at a vehicle rearward side and the part having the matching surface is formed as a curved surface or as a flat surface which is inclined toward an outer side of the housing with respect to a direction of the matching surface substantially at a vehicle frontward side.

In accordance with the housing for a member disposed at a vehicle exterior, the corner portion is formed at the outer side position of the matching surface substantially at a vehicle rearward side, whereby an airflow can be guided so as to slowly flow on an outer surface of the part having the corner portion.

In accordance with the housing for a member disposed at a vehicle exterior having the above-described structure, the airflow flowing on the outer surface of the part relatively positioned substantially at the vehicle frontward side when the vehicle is traveling (which part is referred to as the "front part" hereinafter) passes on the matching portion and then flows on the outer surface of the part positioned substantially at the vehicle rearward side (which is referred to as the "rear part" hereinafter).

The corner portion of the matching surface of the rear part and the outer surface of the rear part is formed as a curved surface or as a flat surface which is inclined toward the outer side of the housing with respect to the direction of the matching surface of the front part. Thus, the airflow passing on the matching portion is gradually guided toward the outer side of the housing by the above-described curved or flat surface, and then flows on the outer surface of the part positioned substantially at the vehicle rearward side.

Even if the outer surface of the rear part is positioned further toward the outer side of the housing part than the outer surface of the front part, the direction of the airflow flowing on the surface of the housing cannot be changed rapidly in a vicinity of the matching portion of the parts. As a result, the unpleasant noise (for example, the noise of cutting the wind) can be reduced or prevented.

The housing for a member disposed at a vehicle exterior is preferably formed of a synthetic resin material which becomes hard after hardening thereof. Further, the plurality of parts, in an assembled together state, is mounted at a side of a door of a vehicle, and a mirror is accommodated within an assembly of the plurality of parts assembled together. Moreover, a support, which supports the mirror such that the mirror can pivot about axes which are substantially along a vehicle vertical direction and the vehicle longitudinal direction, is accommodated within the assembly. At least one driving device for pivoting the mirror is accommodated within the assembly, and the housing further includes a lower wall.

Further, the housing of the present invention is applied to a housing of a device which is mounted at the side of the door at the vehicle exterior or on the body panel and in which, other than a reflecting device such as a mirror or the like, a lighting device such as a light bulb or the like, an alarm device such as an alarm whistle, or the like may be accommodated. Thus, the above-described unpleasant noise (for example, the noise of cutting the wind) can be reduced or prevented.

DESCRIPTION OF THE PREFERRED EMBODIMENTS

Embodiments of the present invention will be described hereinafter with reference to the drawings by taking a door mirror as an example.

The embodiments of the present invention include first and second embodiments. The first embodiment will be described first, and then the second embodiment will be described.

Figure 5:
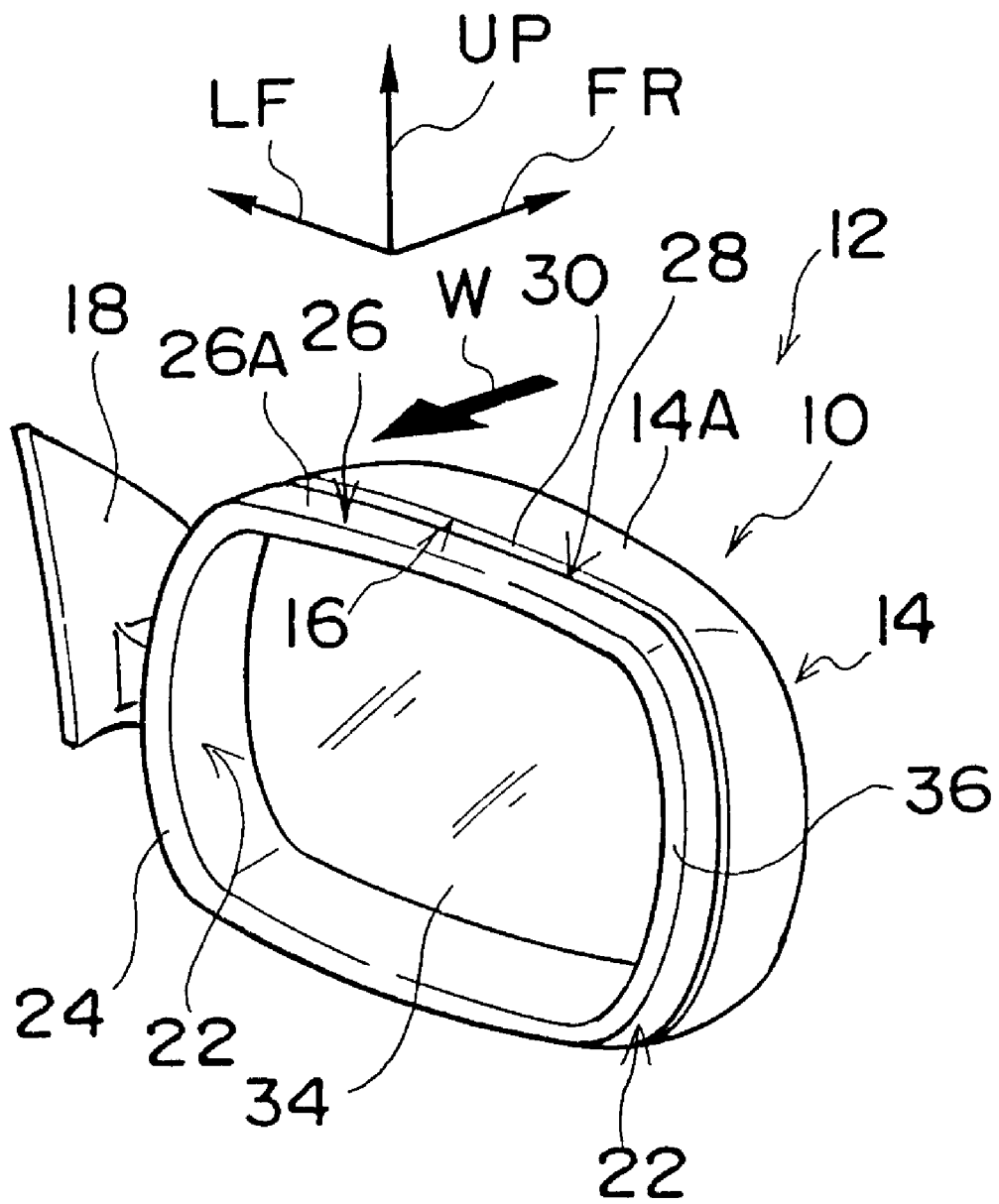
FIG. 5 is a perspective view of an exterior of the door mirror to which the housing relating to the first embodiment of the present invention is applied.

FIG. 5 is a perspective view of an exterior of a door mirror 12 to which a visor 10 serving as a housing relating to the first embodiment of the present invention is applied. In the respective drawings, the arrow FR points substantially toward a front of a vehicle, the arrow LF points substantially toward a left side of a vehicle, and the arrow UP points substantially upward. Orientations of respective parts of the door mirror 12 will be described hereinafter. The orientations which will be described are basically the orientations when the door mirror 12 is used while a vehicle (not shown) is traveling.

As shown in FIG. 5, the visor 10 of the door mirror 12 has a visor cover 14 as a part thereof. The visor cover 14 is formed of a synthetic resin material which becomes hard after the hardening thereof, and is formed in a substantial box shape or in a substantial bowl shape such that one end thereof is open. When the visor cover 14 is mounted to the vehicle (not shown), an end portion thereof substantially at the vehicle rearward side is an open end 16. An outer diameter of the visor cover 14 becomes gradually smaller substantially toward the vehicle frontward side. An end portion of the visor cover 14 substantially at the vehicle frontward side is a bottom portion.

A connecting portion 18 is formed at a portion of the visor cover 14 which faces the vehicle interior side substantially in the vehicle transverse direction. The connecting portion 18 is connected to the vehicle at the side of a door panel corresponding to a driver's seat or a front passenger's seat of the vehicle, such that the visor cover 14 is thereby mounted to the vehicle. In general, the visor cover 14 is usually connected to the vehicle with its axial direction being substantially the vehicle vertical direction so as to be pivotable about the axis over a predetermined angle. The orientation of the above-mentioned open end 16 of the visor cover 14 is changed toward the vehicle interior side substantially in the vehicle transverse direction, depending on the pivot position of the visor cover 14.

Figure 1:
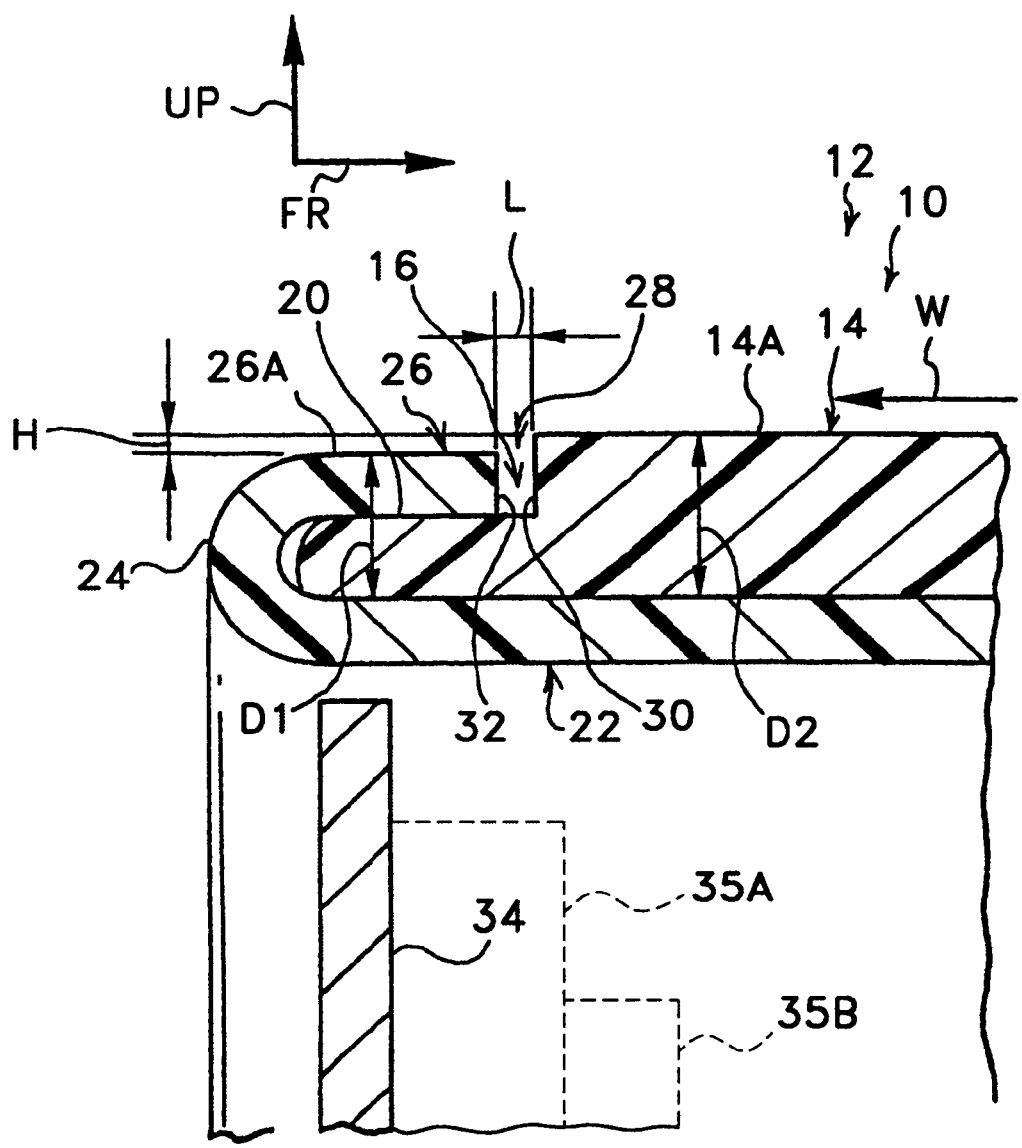
FIG. 1 is an enlarged cross-sectional view of a main portion of a door mirror to which a housing relating to a first embodiment of the present invention is applied.
Figure 2:
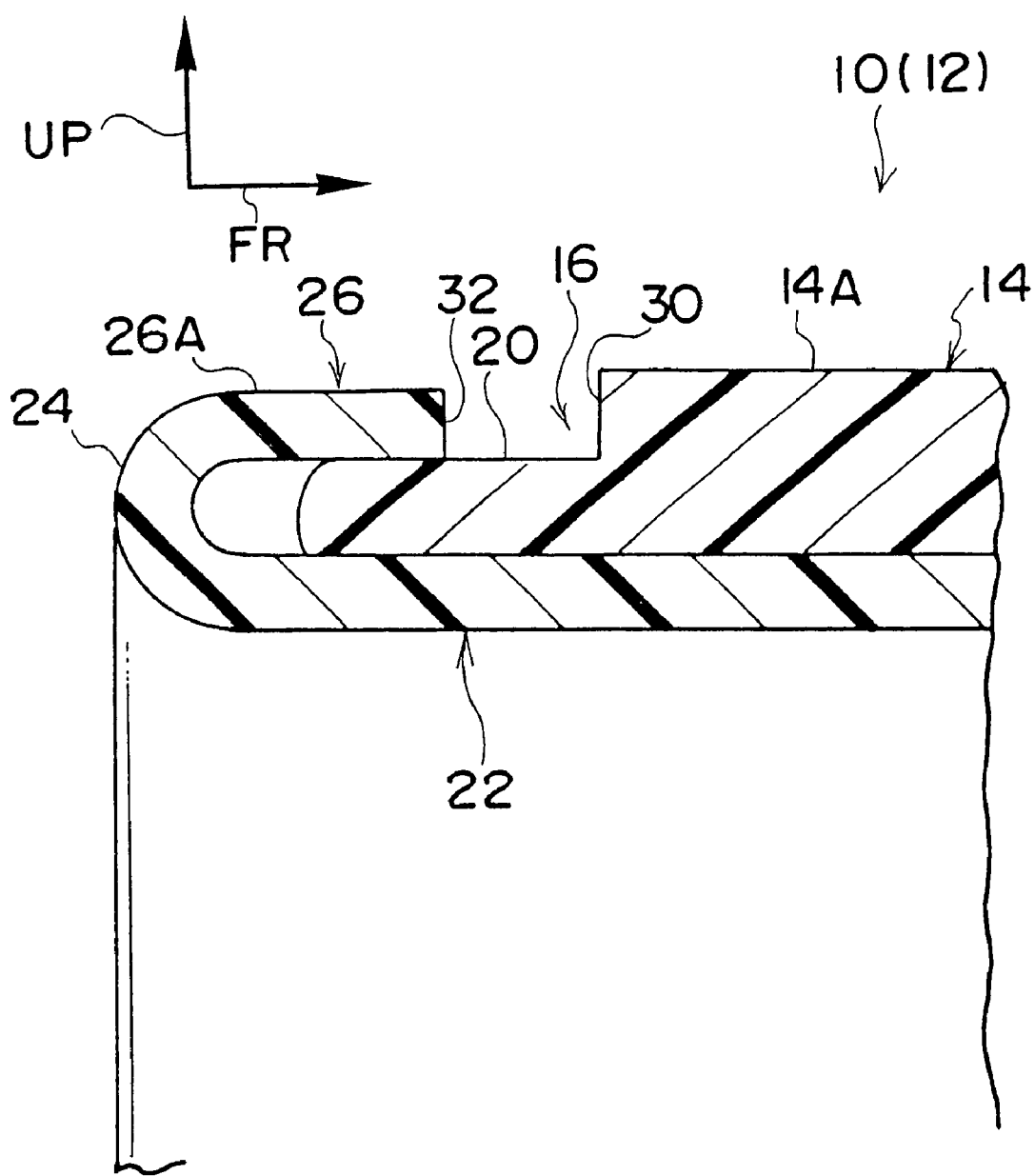
FIG. 2 is a cross-sectional view corresponding to FIG. 1 and showing a state before a visor cover and a visor rim which are parts of a housing have been assembled.

As shown in FIGS. 1 and 2, a fitting portion 20 is formed at the open end 16 of the visor cover 14 so as to extend from the open end 16. The thickness of the fitting portion 20 is thinner than the thickness of the visor cover 14 in the vicinity of the open end 16.

A visor rim 22, which is a part for forming the visor 10 together with the visor cover 14, is mounted to the open end 16 side of the visor cover 14. In the same way as the visor cover 14, the visor rim 22 is formed of a synthetic resin material which becomes hard after the hardening thereof. An outer peripheral shape of the visor rim 22 is formed in an annular shape so as to correspond to the outer peripheral shape of the visor cover 14. Further, the visor rim 22 is formed in a substantial box shape with its end portion at the bottom portion side of the visor cover 14 being closed.

A fitting portion 26 is formed at the outer side of the open end side of the visor rim 22 and at the outer peripheral side of the fitting portion 20 of the visor cover 14. The inner peripheral shape of the fitting portion 26 of the visor rim 22 corresponds to the outer peripheral shape of the fitting portion 20 of the visor cover 14. The thickness of the fitting portion 26 of the visor rim 22 is thinner than the thickness of the visor cover 14, except for the thickness of the visor cover 14 at the fitting portion 20. Basically, the sum of the thickness of the fitting portion 20 of the visor cover 14 and the thickness of the fitting portion 26 of the visor rim 22 is set so as to be close to the thickness of the visor cover 14 at regions thereof other than the fitting portion 20 of the visor cover 14. A detailed description thereof will be given later.

The fitting portion 26 of the visor rim 22 is connected via a substantially U-shaped connecting portion 24 to a main body portion of the visor rim 22. In a state in which the fitting portion 26 of the visor rim 22 is fitted together with the fitting portion 20 of the visor cover 14, the main body portion of the visor rim 22 is fitted to the fitting portion 20 at an inner peripheral side of the fitting portion 20 of the visor cover 14. The fitting portion 20 of the visor cover 14 is nipped by the fitting portion 26 of the visor rim 22 and the main body portion of the visor rim 22. The visor rim 22 is thereby mounted to the visor cover 14.

In a state in which the visor rim 22 is mounted to the visor cover 14, an end surface of the open end 16 of the visor cover 14, which is a proximal end of extension of the fitting portion 20 of the visor cover 14, opposes an end surface of the fitting portion 26 of the visor rim 22 substantially in the vehicle longitudinal direction. Hereinafter, the end surface of the fitting portion 26 of the visor rim 22 is referred to as a matching surface 32. The end surface of the open end 16 of the visor cover 14 opposing the matching surface 32 is referred to as a matching surface 30. As shown in FIG. 1, a portion at which the matching surface 30 and the matching surface 32 oppose one another is exposed at the outer surface of the visor 10 as a boundary between the visor cover 14 and the visor rim 22 on the outer surface of the visor 10, that is, as a matching portion 28.

As shown in FIG. 1, dimensions, in design, of respective portions of the visor cover 14 in a vicinity of the open end 16 and of the fitting portion 26 of the visor rim 22 are set such that a distance L of 0.5 mm is formed between the matching surfaces 30 and 32 when the visor cover 14 and the visor rim 22 are assembled together.

In the visor 10 of the present invention, given that, in design, the sum of the distance between the fitting portion 26 and the visor rim 22 and the thickness of the fitting portion 26 is D1, and the thickness of the main body portion of the visor cover 14 in a vicinity of the open end 16 other than the fitting portion 20 is D2, D2 is larger than D1. A dimensional difference (a difference in levels) H between D1 and D2 is, in design, 0.3 mm. Thus, when viewing the visor 10 of the present invention substantially from the vehicle frontward side, the matching surface 32 is hidden by the visor cover 14 and cannot be seen.

A mirror main body 34 serving as a mirror for viewing is accommodated within the visor 10 with the above-described structure. The mirror main body 34 is disposed such that its reflecting surface faces substantially, in a vicinity of the visor rim 22, the open end side of the visor rim 22 substantially in the vehicle rearward direction. The mirror main body 34 is supported by a support 35A (shown in phantom) accommodated within the visor 10. Driving devices 35B such as one or a plurality of motors are accommodated within the visor 10. The driving devices rotate a supporting body with its axial directions being substantially along the vehicle vertical direction and the vehicle longitudinal direction, so that the orientation of the reflecting surface of the mirror main body 34 can be appropriately changed.

In the visor 10 of the present invention, as shown in FIG. 2, the visor rim 22 is mounted to the visor cover 14 substantially from the vehicle rearward side.

As described above, the visor cover 14 and the visor rim 22 which form the visor 10 are formed of synthetic resin materials. A synthetic resin material shrinks at a time of hardening, and therefore, errors in dimensions of respective portions of the visor cover 14 and the visor rim 22 are generated. It has been known that such dimensional errors are not fixed amounts and change depending on the thicknesses of the portions, the longitudinal dimensions thereof, the position of a portion for injecting the synthetic resin material in a die for molding, and the like. Thus, the dimensional difference between the matching surfaces 30 and 32 along the thickness directions of the visor cover 14 and the visor rim 22, that is, the difference H in levels at the matching portion 28 between the outer surface 14A of the visor cover 14 and the outer surface 26A of the fitting portion 26 (the visor rim 22) is different for respective portions along the outer peripheral directions of the visor cover 14 and the visor rim 22.

In the first embodiment, however, the dimensions of the respective portions of the visor cover 14 including the fitting portion 20 and the visor rim 22 including the fitting portion 26 are set such that the dimensional difference H is 0.3 mm in design. Thus, even if the visor cover 14 and the visor rim 22 shrink at a time of hardening thereof or even if there are errors in the dimensions of dies for molding the visor cover 14 and the visor rim 22, the dimensional difference H cannot be less than 0. Namely, at the matching portion 28, the outer surface 26A of the fitting portion 26 (the visor rim 22) cannot be positioned at the outer side of the visor 10 with respect to the outer surface 14A of the visor cover 14.

Figure 3A:
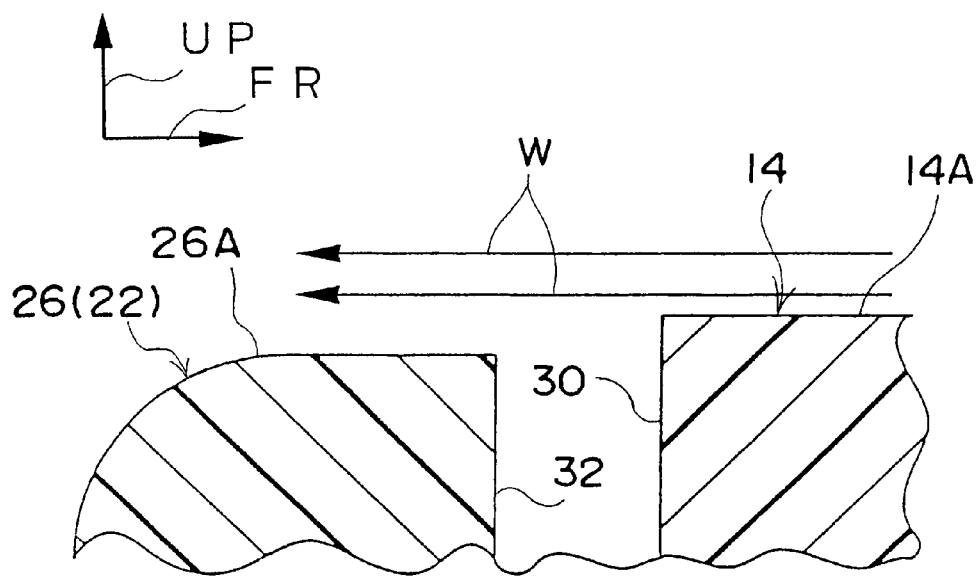
FIG. 3A is a cross-sectional view showing the flow of airflow in the first embodiment.
Figure 3B:
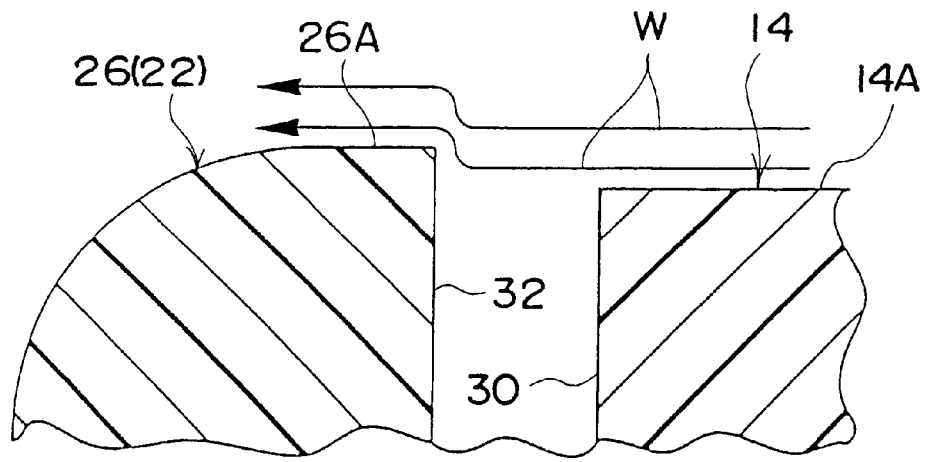
FIG. 3B is a cross-sectional view showing the flow of airflow in a state in which dimensions of matching surfaces are opposite to those of the first embodiment.

As shown in FIG. 3B, at the matching portion 28, if the outer surface 26A of the fitting portion 26 is positioned further toward the outer side of the visor 10 than the outer surface 14A of the visor cover 14 is, an airflow W flowing on the surface of the visor 10 collides with the matching surface 32 while the vehicle is traveling, or the direction of the airflow is rapidly changed such that a so-called noise of cutting the wind is generated.

In contrast, in the visor 10 of the present invention, as shown in FIG. 3A, at the matching portion 28, the outer surface 26A side of the fitting portion 26 cannot be positioned further toward the outer side of the visor 10 than the outer surface 14A side of the visor cover 14 is. Accordingly, the airflow W does not collide with the matching surface 32 and the direction of the airflow is not changed rapidly, such that generation of the unpleasant noise such as the noise of cutting the wind or the like can be effectively reduced or prevented.

Figure 4:
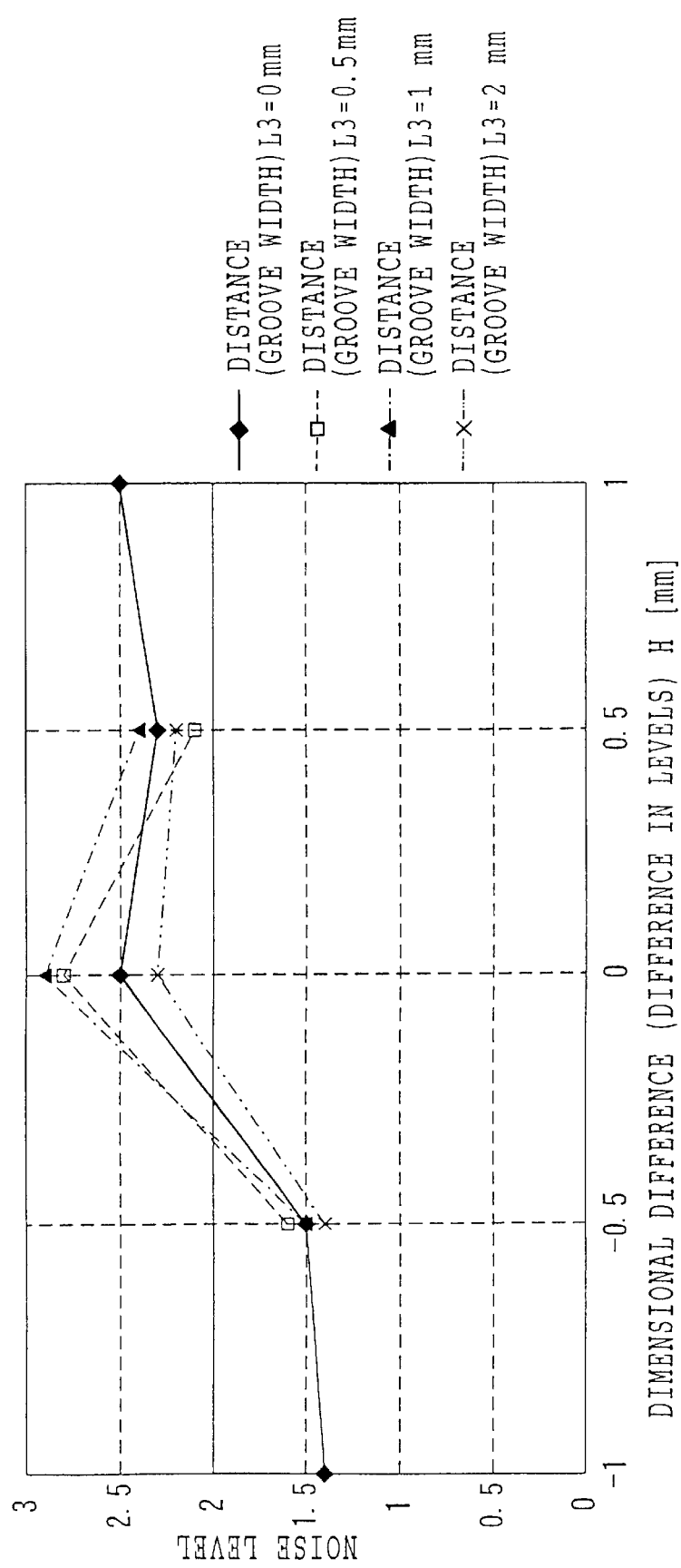
FIG. 4 is a graph of sensory evaluation results showing a relationship between a dimensional difference H, a distance L and noise level.

As described above, in the first embodiment, dimensions of respective portions of the visor cover 14 and of the visor rim 22 are set such that the dimensional difference H is 0.3 mm in design. Thus, the actual dimension of the dimensional difference H after molding the visor cover 14 and the visor rim 22 cannot exceed 0.5 mm. Here, FIG. 4 shows sensory evaluation results in which the relationship between the magnitude of the difference H in levels and the noise level of the unpleasant noise such as the noise of cutting the wind or the like is measured. In FIG. 4, the larger the numerical values of the noise level become, the greater the reduction in noise becomes. A noise level of 2 means that passengers do not mind the noise. A difference H in levels which is a negative numerical value means that, as shown in FIG. 3B, the end portion of the matching surface 32 at the outer surface 26A side is positioned further toward the outer side of the visor 10 than the end portion of the matching surface 30 at the outer surface 14A side is. The relationship between a groove width (distance L) and the noise level is also expressed by the results of sensory evaluation, as will be described later.

As shown in FIG. 4, basically, even if two dimensional differences (differences in levels) H have the same absolute value, when the dimensional difference H is −0.5 mm, the noise level is 1.5 which is inferior. On the other hand, when the dimensional difference H is 0.5 mm, the noise level exceeds 2 which is a level at which the passengers do not mind the noise. Accordingly, dimensions of respective portions of the visor cover 14 and of the visor rim 22 are set such that the dimensional difference H is 0.3 mm in design. In this way, in the first embodiment, the actual dimension of the dimensional difference H after molding the visor cover 14 and the visor rim 22 cannot exceed 0.5 mm. As a result, the unpleasant noise such as the noise of cutting the wind or the like can be effectively reduced.

As described above, the dimension of the fitting portion 26 of the visor rim 22 and of the fitting portion 20 of the visor cover 14 are different for respective portions along the outer peripheral directions of the visor cover 14 and of the visor rim 22 due to shrinking of the synthetic resin material at a time of hardening thereof, or due to dimensional errors of dies, or the like.

In the first embodiment, however, the dimension of the respective portions of the visor cover 14 and of the visor rim 22 are set such that the distance L is 0.5 mm in design. Thus, even if shrinkage occurs at a time of hardening, the actual dimension of the distance L is 1.0 mm or less.

As shown in FIG. 4, in a case in which the above-described difference in levels (dimensional difference) H is 0, if the distance L is 1.0 mm or less, the noise level is at least 2.5 and a large reduction in noise can be ensured. Further, even if the difference in levels (the dimensional difference) H is 0.5 mm, as long as the distance L is around 1.0 mm, a noise level of near 2.5 can be maintained. In the first embodiment, because the set value of the distance L in design is 0.5 mm, the actual distance L after molding the visor cover 14 and the visor rim 22 cannot exceed 1.0 mm. As a result, the unpleasant noise such as the noise of cutting the wind or the like can be effectively reduced.

Further, in the visor cover 14 of the present invention, when the actual distance L is 1.0 mm or less, the actual dimension of the dimensional difference H is 0.5 mm or less, which does not affect the exterior of the visor cover 14. Thus, the exterior of the door mirror 12 and therefore the exterior of the vehicle are not be damaged.

Next, a second embodiment of the present invention will be described. Portions which are basically the same as those of the above-described first embodiment are designated by the same reference numerals and descriptions thereof will be omitted.

Figure 6:
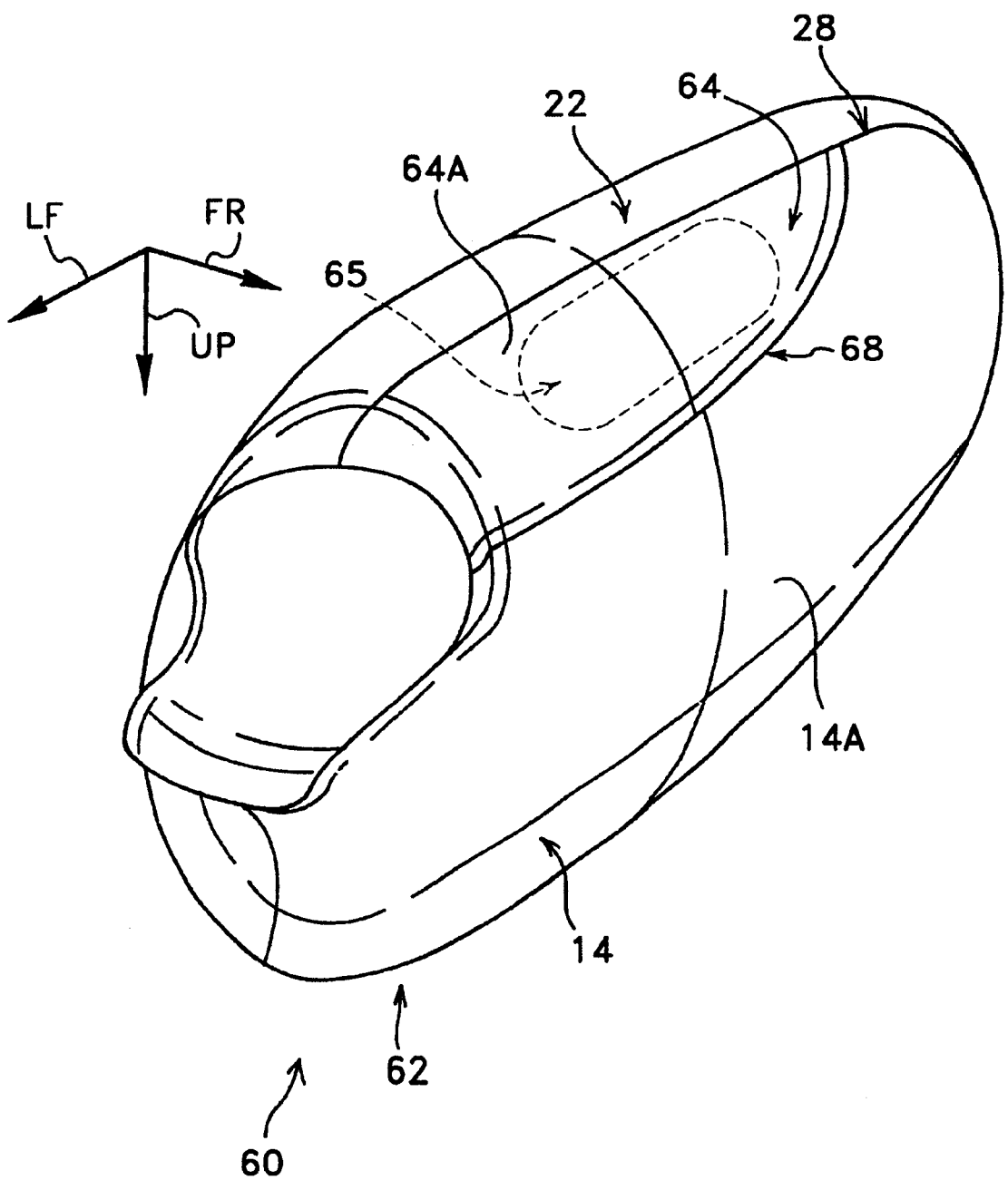
FIG. 6 is a perspective view, as seen from the bottom side, of a housing relating to a second embodiment of the present invention.

FIG. 6 is a perspective view, as seen from a bottom surface side, of a structure of a visor 62 of a door mirror 60 serving as a housing relating to the second embodiment. As shown in FIG. 6, in addition to the visor cover 14 and the visor rim 22, the visor 62 of the present invention has a lower wall 64 as a part which is formed by a synthetic resin material which becomes hard after the hardening thereof, like the visor cover 14 and the visor rim 22. Basically, this lower wall 64 is, in the above-described first embodiment, a part of the visor cover 14 and is integrally molded together with the visor cover 14. However, in the second embodiment, the visor cover 14 and the lower wall 64 are formed as separate parts. The lower wall 64 may optionally accommodate a lighting device 65 (indicated in phantom).

Figure 7:
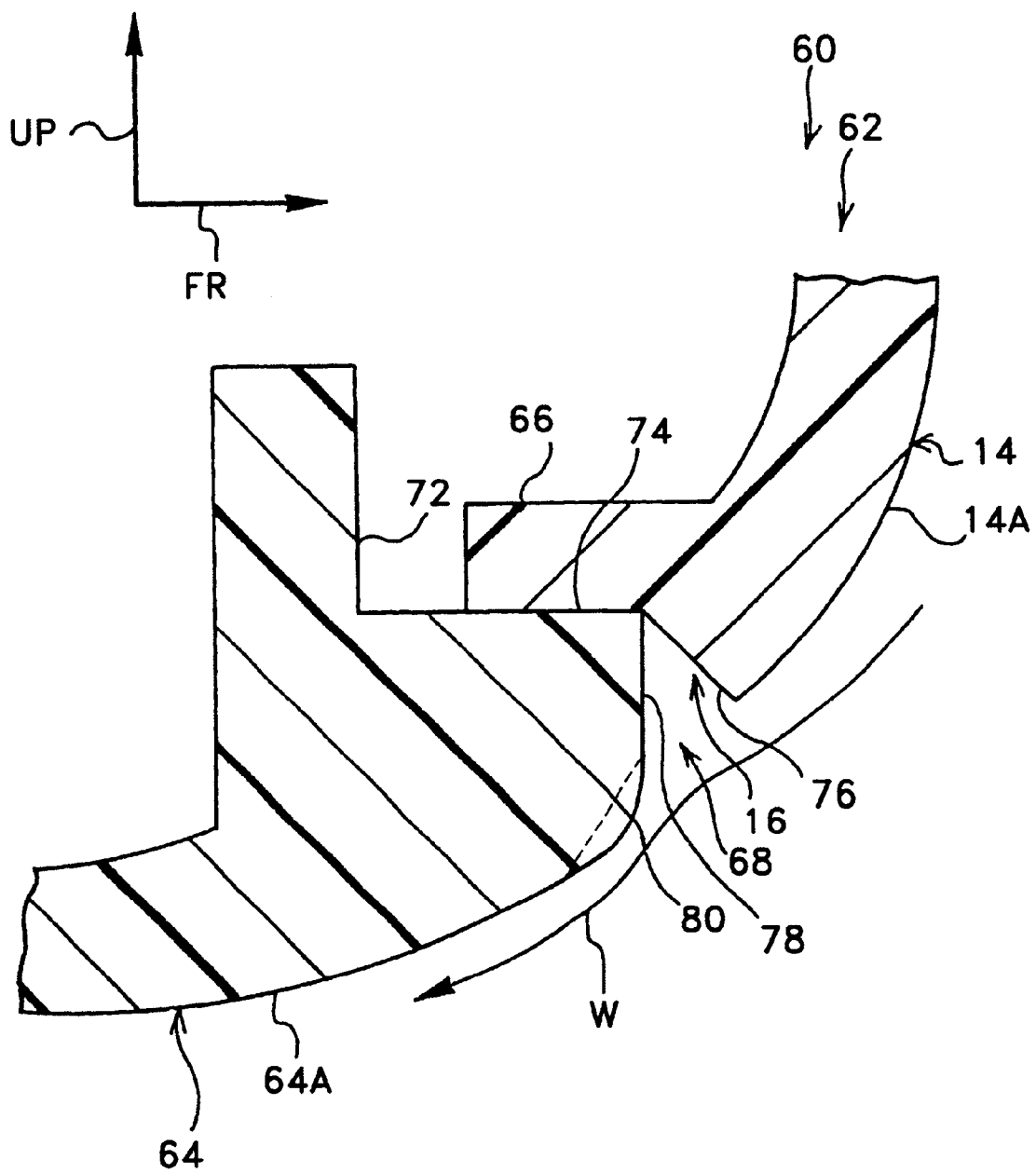
FIG. 7 is a cross-sectional view of a matching portion of the housing relating to the second embodiment of the present invention.

FIG. 7 shows a cross-sectional view of a connecting portion between the visor cover 14 and the lower wall 64. As shown in FIG. 7, a fitting portion 66 is formed at a portion of the open end 16 of the visor cover 14 adjacent to the lower wall 64 so as to extend toward the lower wall 64 side. This fitting portion 66 is formed along a matching portion 68 which is a boundary of the outer surface 14A of the visor cover 14 and an outer surface 64A of the lower wall 64 shown in FIG. 6.

As shown in FIG. 7, a rib 72 is formed at a portion of an outer peripheral end of the lower wall 64 adjacent to the visor cover 14 in order to reinforce the lower wall 64. Further, a fitting portion 74 is formed from the rib 72 toward the visor cover 14 side. The fitting portion 74 is also formed along the matching portion 68 shown in FIG. 6, in the same way as the fitting portion 66 of the visor cover 14. As shown in FIG. 7, the visor cover 14 is connected to the lower wall 64 by placing the fitting portion 66 of the visor cover 14 on the fitting portion 74 of the lower wall 64. Alternatively, in a state in which the fitting portion 66 is placed upon the fitting portion 74, welding or screwing is carried out at a portion which is not shown in FIGS. 6 and 7, such that the visor cover 14 and the lower wall 64 are integrally connected.

As shown in FIG. 7, a portion of the open end 16 of the visor cover 14 opposing the fitting portion 74 of the lower wall 64 is a matching surface 76. A portion opposing the matching surface 76 of the fitting portion 66 of the visor cover 14 is a matching surface 78. A space between the matching surfaces 76 and 78 is the above-described matching portion 68.

A curved surface 80 is formed at a corner portion between the matching surface 78 and the outer surface 64A of the lower wall 64. The curved surface 80 curves gradually at an inner surface side of the visor 62 toward the visor cover 14 side. An end portion of the curved surface 80 at the matching surface 78 side (a connecting portion with the matching surface 78) is positioned further toward the inner surface side of the visor 62 than an end portion of the matching surface 76 at the outer surface 14A side.

In the visor 62 with the above-described structure, at the matching portion 68, an end portion of the curved surface 80 at the visor cover 14 side continues to an end portion of the matching surface 78 at the outer surface 64A side at the side further toward the inner surface of the visor 62 than the end portion of the matching surface 76 at the outer surface 14A side, and then continues to the matching surface 78. Thus, the airflow W passing on the outer surface 14A of the visor cover 14 does not collide with the matching surface 78 and is guided to the curved surface 80. Then, the airflow W passes on the outer surface 64A of the lower wall 64.

The curved surface 80 is gradually curved in the inner surface side of the visor 62 toward the visor cover 14 side. Thus, the curved surface 80 does not oppose the airflow W along the direction in which the airflow W advances. The airflow W is slowly guided to the outer surface 64A side of the lower wall 64 by the curved surface 80 and flows on the outer surface 64A. (That is, the curved surface 80 can be considered as to be an airflow guide portion which guides the airflow W gradually toward the outer surface 64A side of the lower wall 64.)

Accordingly, in the visor 62 of the second embodiment, even if the outer surface 64A of the lower wall 64 is positioned further toward the outside of the visor 62 than the outer surface 14A of the visor cover 14, the visor 62 does not have portions with which the airflow W collides or by which the direction of the airflow W is rapidly changed. As a result, generation of the unpleasant noise such as the noise of cutting the wind or the like can be effectively reduced or prevented.

In the second embodiment, the airflow guide portion is the curved surface 80. For example, instead of the curved surface 80, a flat and inclined surface (indicated in phantom) which inclines toward the outside of the visor 62 with respect to the matching surface 76 side can be used. The inclined surface acts in the same way as the curved surface 80 and has the same effects as that of the curved surface 80.

In the second embodiment, the end portion of the curved surface 80 at the matching surface 78 side (the connecting portion between the curved surface 80 and the matching surface 78) is positioned further toward the inner surface side of the visor 62 than the end portion of the matching surface 76 at the outer surface 14A side. However, in a case in which the airflow guide portion for smoothly guiding the airflow W such as the curved surface 80 is provided at a corner portion between the matching surface 78 and the outer surface 64A of the lower wall 64, the relative positional relationship between the end portion of the matching surface 76 at the outer surface 14A side and the end portion of the matching surface 78 at the outer surface 64A side or an amount of displacement thereof need not be set as in the above-described first embodiment. That is, even if the end portion of the matching surface 78 at the outer surface 64A side is displaced further toward the outer side of the housing 60 than the end portion of the matching surface 76 at the outer surface 14A side, when the airflow guide portion such as the curved surface 80 is provided at the corner portion, the airflow W can be slowly guided toward the outer surface 64A side of the lower wall 64 so as to flow on the outer surface 64A as compared to a structure in which the airflow guide portion such as the curved surface 80 or the like is not provided at the corner portion. Thus, generation of the unpleasant noise such as the noise of cutting the wind or the like can be effectively reduced or prevented.

In the above-described first and second embodiments, the housing relating to the present invention is applied to the visors 10 and 62 of the door mirrors 12 and 60. However, the housing of the present invention is not limited to the visors 10 and 62 and can be widely applied as long as it is a housing of a device disposed at the vehicle exterior. Examples of the housing include a visor of a fender mirror provided at a front end portion of a vehicle, a housing of a lamp or the like provided on a roof panel used in a commercial vehicle such as a taxi or the like, and the like. From the standpoint of reducing or preventing the unpleasant noise such as the noise of cutting the wind or the like, it is needless to say that the present invention is suitably used for the visors 10 and 62 of the door mirrors 12 and 60 provided at positions relatively near a driver and a front passenger.

As described above, in the present invention, the unpleasant noise due to the airflow flowing on the outer surface can be effectively reduced or prevented.

What is claimed is:

1. A housing for a member disposed at a vehicle exterior which is formed by assembling a plurality of parts substantially in a vehicle longitudinal direction, the housing comprising:

a matching portion which is exposed at an outer surface of the housing at a boundary of the plurality of parts when the plurality of parts are assembled together; and parallel matching outside surfaces of the plurality of parts which oppose each other at the matching portion and are aligned substantially in the vehicle longitudinal direction, wherein a housing outer side end portion of the outside matching surface positioned substantially at a vehicle frontward side is displaced further toward an outer side than a housing outer side end portion of the parallel outside matching surface positioned substantially at a vehicle rearward side.

2. The housing for a member disposed at a vehicle exterior according to claim 1, wherein the plurality of parts are formed of a synthetic resin material which becomes hard after hardening thereof.

3. The housing for a member disposed at a vehicle exterior according to claim 1, wherein, among the parallel matching surfaces opposing each other and aligned substantially along the vehicle longitudinal direction, said displacement of a housing outer side end portion of the matching surface positioned substantially at the vehicle frontward side with respect to the housing outer side end portion of the matching surface positioned substantially at the vehicle rearward side is 0.5 mm or less.

4. The housing for a member disposed at a vehicle exterior according to claim 3, wherein a distance between the matching surfaces opposing each other substantially in the vehicle longitudinal direction is 1.0 mm or less.

5. The housing for a member disposed at a vehicle exterior according to claim 2, wherein one of the plurality of parts assembled together substantially in the vehicle longitudinal direction has a fitting portion having a substantially U-shaped connecting portion.

6. The housing for a member disposed at a vehicle exterior according to claim 1, wherein the plurality of parts, in an assembled together state, is mounted to a body panel of a vehicle, and a lighting device is accommodated within an assembly of the plurality of parts assembled together.

7. The housing for a member disposed at a vehicle exterior according to claim 2, wherein the plurality of parts, in an assembled together state, is mounted at a side of a door of a vehicle, and a mirror is accommodated within an assembly of the plurality of parts assembled together.

8. The housing for a member disposed at a vehicle exterior according to claim 7, wherein a support, which supports the mirror such that the mirror can pivot about axes which are substantially along a vehicle vertical direction and the vehicle longitudinal direction, is accommodated within the assembly.

9. The housing for a member disposed at a vehicle exterior according to claim 8, wherein at least one driving device for pivoting the mirror is accommodated within the assembly.

10. A housing for a member disposed at a vehicle exterior which is formed by assembling a plurality of parts together substantially in a vehicle longitudinal direction, the housing comprising:

a matching portion which is exposed at an outer surface of the housing at a boundary between the plurality of parts when the plurality of parts are assembled together; and matching surfaces of the plurality of parts opposing each other at the matching portion substantially in the vehicle longitudinal direction, wherein a corner portion of the matching surface substantially at a vehicle rearward side and the part having the matching surface is formed as a curved surface or as a flat surface which is inclined toward an outer side of the housing with respect to a direction of the matching surface substantially at a vehicle frontward side.

11. The housing for a member disposed at a vehicle exterior according to claim 10, wherein the corner portion is formed at the outer side position of the matching surface substantially at a vehicle rearward side, whereby an airflow can be guided so as to slowly flow on an outer surface of the part having the corner portion.

12. The housing for a member disposed at a vehicle exterior according to claim 11, wherein the plurality of parts are formed of a synthetic resin material which becomes hard after hardening thereof.

13. The housing for a member disposed at a vehicle exterior according to claim 11, wherein the plurality of parts, in an assembled together state, is mounted to a body panel of a vehicle, and a lighting device is accommodated within an assembly of the plurality of parts assembled together.

14. The housing for a member disposed at a vehicle exterior according to claim 12, wherein the plurality of parts, in an assembled together state, is mounted at a side of a door of a vehicle, and a mirror is accommodated within an assembly of the plurality of parts assembled together.

15. The housing for a member disposed at a vehicle exterior according to claim 14, wherein a support, which supports the mirror such that the mirror can pivot about axes which are substantially along a vehicle vertical direction and the vehicle longitudinal direction, is accommodated within the assembly.

16. The housing for a member disposed at a vehicle exterior according to claim 15, wherein at least one driving device for pivoting the mirror is accommodated within the assembly.

17. The housing for a member disposed at a vehicle exterior according to claim 16, further comprising a lower wall.

18. A housing for a member disposed at a vehicle exterior which is formed by assembling a plurality of parts together substantially in a vehicle longitudinal direction, the housing comprising:

a matching portion which is exposed at an outer surface of the housing at a boundary between the plurality of parts when the plurality of parts are assembled together; and matching surfaces of the plurality of parts opposing each other at the matching portion substantially in the vehicle longitudinal direction, wherein said matching surfaces include, at a vehicle rearward side, a corner portion having a rounded surface or a flat surface inclined obliquely to said vehicle longitudinal direction that forms an outer portion of said housing such that an airflow flowing from a vehicle front side to said vehicle rearward side flows over said rounded or oblique surface with less resistance than if said corner portion included a surface orthogonal to said vehicle longitudinal direction.

* * * * *